May 27, 1941.   D. C. BAILEY   2,243,743
PANEL TRIM RETAINER
Filed Nov. 9, 1939

Inventor.
David C. Bailey
by L. S. Henniman
Atty.

Patented May 27, 1941

2,243,743

UNITED STATES PATENT OFFICE 2,243,743

PANEL TRIM RETAINER

David C. Bailey, Amesbury, Mass.

Application November 9, 1939, Serial No. 303,650

6 Claims. (Cl. 296—44)

This invention relates to a combined windlace and panel trim retainer, which is primarily designed for use in connection with the construction of sheet metal automobile bodies.

It has been customary to trim the interior of automobile bodies, which are largely constructed of sheet metal, by providing panels of cardboard, or like material, which are cut out to fit the various metal surfaces which it is necessary to cover, and attach cloth to the surface of the cardboard, usually by means of an adhesive, and then secure the covered panels in position.

It has also been customary to provide the door pillars with a windlace which consists of a cylindrical strip of rubber covered with cloth and held in such a position that the door closes against it, so that a tight joint is provided between the door and pillar.

The means which have been employed to secure the panel trim and windlace in position are unsatisfactory and expensive and the primary object of my invention is to provide an improved means for performing this operation, which will be more effective and less expensive than present methods.

I accomplish this object by providing the door pillar, or other part of the automobile body to which the panel trim is to be applied with a narrow groove or slot which extends along the edge of the panel, and by providing a retaining strip, which consists of a core of transversely corrugated sheet metal which is adapted to be bent in any direction and is bent transversely in U-form, or V-form, to provide two longitudinal side portions and is covered with a suitable fabric, which may also enclose the rubber strip which forms the windlace, and by attaching the strip to the body member by forcing one side portion of the core into the slot of the body member in such a position that the other side portion of the core bears firmly against the surface which is to be covered by the panel trim, so that the latter, on being first placed in position, will be clamped against the edge portion of the panel trim throughout the length of its edge portions, and, as the arrangement is such that considerable force is required to drive the core section into the slot, the strip and panel trim will be securely attached to the body member and the windlace will be held in position for engagement by the door when fully closed.

For a more complete disclosure of my invention reference is now made to the following specification in connection with the accompanying drawing in which.

As my invention may be embodied in several specific forms, these forms will be described in sequence.

Figure 1:
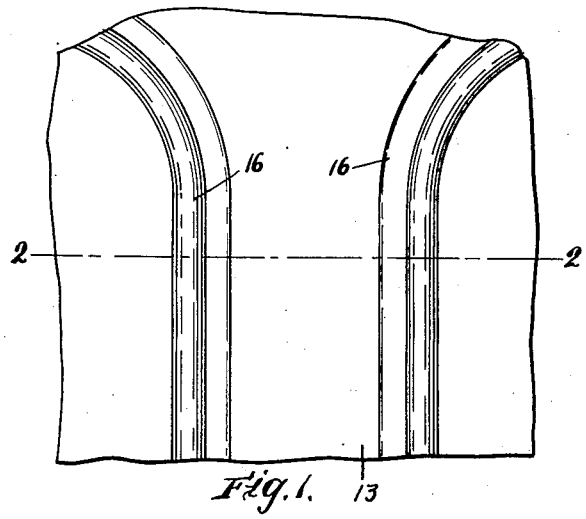
Fig. 1 is a plan view of the inner side of a pillar section.
Figure 2:
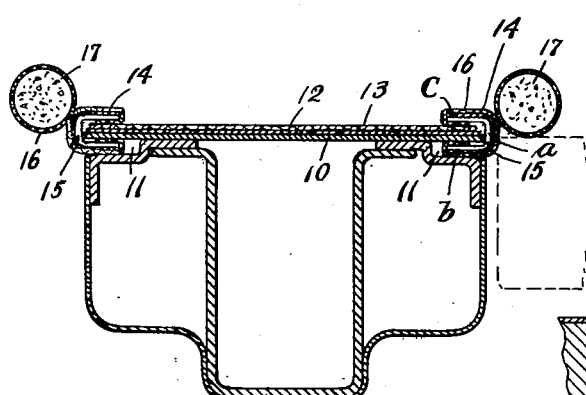
Fig. 2 is a sectional view at line 2—2 of Fig. 1, illustrating one embodiment of my invention.
Figure 3:
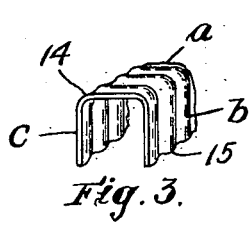
Fig. 3 is a detail perspective view on an enlarged scale of a portion of the core of the panel trim retaining strip which is employed.

In the form shown in Figs. 1 to 3, a body panel 10 is indicated which may be the inner side of a door pillar and at each edge of the panel a narrow slot 11 is formed, which extends inwardly from the edge for the length of the panel, and in this form of the invention the slot extends parallel to the surface of the panel.

I further provide a panel trim which consists of a sheet of cardboard 12, which is died out to conform to the shape of the panel and is covered with a suitable fabric 13, which is adhesively connected thereto.

The panel retainer which is employed in this connection comprises a core 14 which consists of a strip of thin sheet metal having closely spaced transverse corrugations 15 extending from edge to edge thereof, said core being bent transversely into U-form, thereby providing a middle portion $a$ and two longitudinal side portions $b$ and $c$. The core thus formed may be readily bent in any plane or direction. The core is also covered with a fabric 16, which extends from within the inner sides of the core about the outer sides and middle portion thereof and is adhesively secured thereto. In the present instance the fabric encloses a strip of cylindrically shaped rubber 17, which is arranged on the middle portion of the core.

In assembling the parts thus far described, the panel trim 12 with the fabric covering thereon is placed in position on the panel and then one side portion of the core is forced into the slot 11 and the other side portion is forced onto the panel trim, so that the edge portion thereof is covered by the side portion of the strip and is clamped against the panel and secured thereto. The opposite edge portion of the panel trim is likewise secured so that the panel trim is securely held in position throughout the entire length, and presents a finished appearance. The relative thickness of the core side portion and the width of the slot 11 is such that considerable force is required to press the strip member into the slot, so that the strip will be securely held in this position by frictional engagement, the frictional engagement of the corrugated metal being much greater than if the metal were not corrugated. As the edges of the panel are frequently curved the strip may be readily bent correspondingly, as indicated in Fig. 1.

As thus arranged the windlace 17 will be held in such a position that when the door (indicated in Fig. 2, in dotted outline) is in closed position, it will be pressed against the windlace making a tight joint between the door and door pillar.

Figure 4:
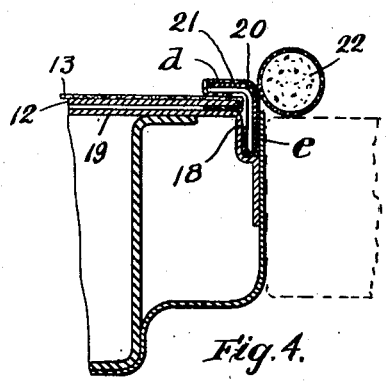
Fig. 4 is a sectional view, similar to Fig. 2, illustrating another form of the invention.
Figure 6:
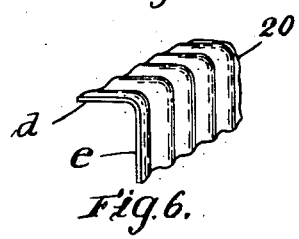
Fig. 6 is a detail perspective view of a portion of the core employed in connection with the retaining strip shown in Fig. 4.

In the form of my invention shown in Fig. 4, the slot 18 at the edge of the panel 19 is extended inward perpendicularly to the surface of the panel, and the core 20 of the strip, which is formed of transversely corrugated sheet metal, as before described, is bent in V-form so that it has two side portions $d$ and $e$ at right angles to each other, as shown in Fig. 6. The core is covered with a fabric 21 which encloses a rubber strip 22, located at the vertex of the angle formed by the sides of the core. In this instance the panel trim 12, 13 is placed in position on the panel, as before described and one of the side portions $e$ is forced into the slot 18 and the other side portion $d$ is pressed against the edge portion of the panel trim, as illustrated, securely clamping the same in position on the panel and holding the windlace 22 in position to be engaged by the door when in closed position.

Figure 5:
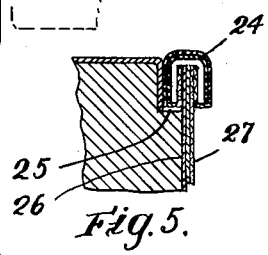
Fig. 5 is a detail sectional view of a third modification of the invention.

In Fig. 5, a form of panel trim retainer 24 is shown which is substantially the same as that shown in Figs. 1 to 3, except that the windlace is omitted. In this instance the slot 25 is parallel to the face side of the panel 26 and the panel trim 27 is clamped against the panel in the manner previously described. This construction is to be employed in other locations than on a door pillar, where the employment of a windlace is unnecessary.

It will be apparent, that when any one of the above forms of my invention are employed the attachment of the panel trim may be readily performed, and at the same time a finished appearance will be secured.

I claim:

1. In combination with a body member having a panel and having a slot at the edge of the panel, a panel trim fitted to the surface of said panel, and a retaining strip having a sheet metal core bent transversely in angular form to provide two longitudinal side portions rigidly held in angular relation, one of said side portions being transversely corrugated and being forced into and tightly fitted in said slot and held therein by frictional engagement, and the other side portion extending onto the edge portion of the panel trim and being forced thereagainst, so as to clamp the latter against the panel.

2. In combination with a body member having a panel and having a slot extending inwardly from the edge of said panel, a panel trim fitted to the surface of said panel, retaining means therefor consisting of a strip of transversely corrugated sheet metal bent transversely to provide two longitudinal side portions rigidly held in angular relation, one of said side portions being forced into and tightly fitted in said slot and held therein by frictional engagement and the other side portion extending onto the edge portion of the panel trim and being forced thereagainst, so as to clamp the latter against the panel.

3. In combination with a body member having a panel and having a slot at the edge of its panel, a panel trim fitted to the surface of said panel, and a retaining strip having a sheet metal core transversely corrugated from edge to edge and bent transversely to provide two longitudinal side portions rigidly held in angular relation, one of said side portions being forced into and tightly fitted in said slot and held therein by frictional engagement and the other side portion being extended onto the edge portion of said panel trim and being forced thereagainst so as to clamp it against the panel.

4. In combination with a body member having a panel, and having a slot extending beneath the surface of the panel from its edge, a panel trim fitted to the surface of the panel, a retaining strip having a transversely corrugated, U-form sheet metal core, the side portions thereof being rigidly held in approximately parallel relation and one of said side portions being forced into and tightly fitted in said slot and held therein by frictional engagement and the other side portion being forced onto the edge portion of the panel trim, to hold it securely against the panel.

5. In combination with a body member having a panel and having a slot extending perpendicularly inward from the edge of said panel, a panel trim fitted to the surface of said panel, a retaining strip having a sheet metal core bent transversely to provide two longitudinal side portions disposed at right angles to each other and rigidly held in angular relation, one of said side portions being transversely corrugated and being forced into and tightly fitted in said slot and held therein by frictional engagement and the other side portion extending over onto the edge portion of the panel-trim and pressed thereagainst to hold it securely against the panel.

6. In combination with a body member having a panel and having a slot extending perpendicularly inward from the edge of said panel, a panel trim fitted to the surface of said panel, a retaining strip having a transversely corrugated sheet metal core bent transversely to provide two longitudinal side portions disposed at right angles to each other, and rigidly held in angular relation, one of said side portions being forced into and tightly fitted in said slot and held therein by frictional engagement and the other side portion being pressed against the edge portion of the panel-trim, to hold it against the panel.

DAVID C. BAILEY.